(12) United States Patent  (10) Patent No.: US 6,975,435 B1
Maitani et al.  (45) Date of Patent: Dec. 13, 2005

(54) IMAGE READER AND METHOD FOR CORRECTING THE QUANTITY OF LIGHT SOURCE

(75) Inventors: Yoshifumi Maitani, Kyoto (JP); Michiyuki Suzuki, Nara (JP); Michiaki Nishimura, Nara (JP); Kazuya Masuda, Nara (JP); Noritomo Nakashima, Yamatokoriyama (JP); Takehiro Kato, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/511,548

(22) Filed: Feb. 23, 2000

(30) Foreign Application Priority Data

Mar. 15, 1999 (JP) .................................. 11-068978

(51) Int. Cl.[7] .......................... H04N 1/04; H04N 1/40; H04N 1/00
(52) U.S. Cl. ....................... 358/475; 358/474; 358/446; 358/401; 358/497; 358/496
(58) Field of Search ................................ 358/496, 497, 358/406, 461, 474, 475, 446, 401

(56) References Cited

U.S. PATENT DOCUMENTS

| 5,099,341 | A | * | 3/1992 | Nosaki et al. ............... 358/461 |
| 5,107,300 | A |   | 4/1992 | Miyake et al. |
| 5,151,796 | A |   | 9/1992 | Ito et al. |
| 5,278,674 | A | * | 1/1994 | Webb et al. ................. 358/475 |
| 5,514,864 | A | * | 5/1996 | Mu-Tung et al. ........... 250/205 |
| 5,864,408 | A | * | 1/1999 | Kumashiro .................. 358/461 |

FOREIGN PATENT DOCUMENTS

| JP | 6197220 | * | 7/1994 | ............ H04N 1/40 |
| JP | 10200711 |   | 7/1998 | |

* cited by examiner

Primary Examiner—Edward Coles
Assistant Examiner—Houshang Safaipour
(74) Attorney, Agent, or Firm—Renner, Otto, Boisselle & Sklar, LLP

(57) ABSTRACT

In the correction of the quantity of light of a light source used in an image reader which irradiates an original document with the light source, receives the reflected light by a CCD and reads the original document image, at the time of a document moving mode in which the document moves, correction of the quantity of irradiation light of the light source is performed by reading a first standard white board which extends over the whole area in the main scanning direction, prior to the initiation of readout of the moving document, and upon initiation of readout of the moving document, a second standard white board arranged outside the document passing area is read by using the same light source, with the read operation of the moving document, and correction of the quantity of irradiation light of the light source is performed based on the reflected light from the second white board.

5 Claims, 8 Drawing Sheets

IMAGE READER AND METHOD FOR CORRECTING THE QUANTITY OF LIGHT SOURCE

BACKGROUND OF THE INVENTION (1) Field of the Invention

The present invention relates to an image reader in a scanner, a unit scanner, a facsimile and the like installed in an image forming apparatus such as a digital copying machine and the like.

(2) Description of the Prior Art

In an image reader in a scanner, conventionally, shading correction is performed prior to the read operation of an original document image. Shading correction is intended for correcting the difference in sensitivity between pixels of a sensor (CCD) which reads an image based on the reflected light from the original document, and for correcting nonuniformity in the quantity of light of a light source comprising a plurality of lamps.

The difference in sensitivity between pixels of the readout sensor and nonuniformity in the quantity of light of the light source cause difference in the image density, and considerably decrease the reproducibility of the halftone image.

With the shading correction, a standard white board serving as a basis of correction is first read, then an image data including the difference in sensitivity between each pixel of the CCD and nonuniformity in the quantity of light of the light source is obtained as the shading data, and the correction value with respect to the image data is determined for each pixel based on this data, to thereby determine the threshold for the white/black judgement.

On the other hand, models installed with a sheet-through type automatic document feeder are recently increasing, and such an image forming apparatus includes a document fixing mode in which an original document is put on an original table, and the document image is read while an optical system is moved along the original table, and a document moving mode in which the original document is read by the optical system located in place, while the original document is moved by means of the sheet-through type automatic document feeder. For example, in Japanese Patent Publication Hei 10 No. 200711, as shown in FIG. 1, a standard white board 82 is set between a moving document read section for reading an original document moved by the automatic document feeder 80 and a fixed document read section for reading a fixed document put on the original table 81, and the shading correction is performed in the document fixing mode and the document moving mode, using the standard white board 82.

With this construction, however, at the time of continuous read in the document moving mode, problems described below occur.

In the case of the document fixing mode, the optical system 83 returns to the home position 84 of the optical system 83 every time when the optical system reads one sheet of document. Therefore, even in the case of continuous readout, white board 82 is irradiated to perform the shading correction every time each document is read, hence the threshold of the white/black judgement does not shift.

However, in the case of the document moving mode, when the optical system 83 initiates read in of the first document, the optical system 83 moves from the home position 84 to the moving document readout position, hence after the reflected light of the white board 82 has been read at the home position for the first document, and the shading correction has been performed, the correction must be performed always at the same correction value.

However, when dozens of documents are read continuously, for example, at the time of continuous copying, since the temperature of the light source increases, the quantity of light decreases, and with the same correction value as that of the first document, the threshold of the white/black judgement shifts. As a result, such problems are caused that the reproducibility of the halftone image decreases and that fogging is caused in the reproduced image.

In addition, even in the document moving mode, this problem can be solved by returning the optical system 83 to a predetermined home position 84 for each document to read the white board 82 and performing the shading correction, but such an operation not only conspicuously decreases the document read rate but also leads to a problem of precision of the document unit and complicated control.

Therefore, with the conventional image reader, in the document moving mode, the data for shading correction is not reacquired during continuous readout.

SUMMARY OF THE INVENTION

The present invention is intended for solving the above described problems, and it is an object of the present invention to provide an image reader which can provide a high quality reproduced image by simply and accurately correcting the change in the quantity of light at the time of continuous readout in the document moving mode and improving the reproducibility of the halftone image, in an image reader which provides the document moving mode or the both document moving/document fixing modes, and to provide a method for correcting the quantity of light of the light source.

The present invention has the following construction in order to attain the above described objects.

A fist gist of the present invention is an image reader having a document moving mode in which an original document carried through a document passing area on an original table is read by a readout section, characterized in that:

a first standard white board being longer than the length of the document passing area with respect to the main scanning direction is provided outside the document passing area;

a second standard white board is provided in an external region of an end portion of the document passing area with respect to the main scanning direction;

a control section controls the readout section in such a way that, in the document moving mode, the readout section reads the first standard white board prior to the initiation of the document read to thereby perform the shading correction, and after the document read has been initiated, the readout section reads the moving document as well as the reflected light of the second standard white board, so as to correct the quantity of irradiation light of the readout section, based on the reflected light from the second standard white board.

A second gist of the present invention is an image reader having both of a document fixing mode in which a readout section moves to read an original document put in a document putting area on an original table, and a document moving mode in which an original document carried through a document passing area on the original table is read by the readout section, characterized in that:

a first standard white board being longer than the length of the document putting area with respect to the main scanning direction is provided outside the document putting area;

a second standard white board is provided in an external region of an end portion of the document passing area with respect to the main scanning direction;

a control section controls the readout section in such a way that, in the document moving mode, readout means reads the first standard white board prior to the initiation of the document read to thereby perform the shading correction, and after the document read has been initiated, the readout section reads the moving document as well as the reflected light of the second standard white board, so as to correct the quantity of irradiation light of the readout section, based on the reflected light from the second standard white board.

A third gist of the present invention is an image reader according to the first or second gist, wherein the second standard white board is provided in the external region of both end portions in the main scanning direction in the document passing area.

A fourth gist of the present invention is a method for correcting the quantity of light of a readout light source used in an image reader which irradiates an original document with the readout light source and reads the original document image based on the reflected light thereof, wherein in a document moving mode in which the original document moves, the moving document image is read by using the readout light source, and the reflected light from a standard white board arranged outside a document passing area is also read; and correction of the quantity of irradiation light of the readout light source is performed based on the reflected light from the standard white board.

A fifth gist of the present invention is a method for correcting the quantity of light of a readout light source used in an image reader which irradiates an original document with the readout light source and reads the original document image based on the reflected light thereof, wherein in a document moving mode in which the document moves, correction of the quantity of irradiation light of the readout light source is performed by reading a first standard white board which is longer than the length in the main scanning direction of a document passing area, prior to the initiation of the document read;

upon initiation of readout of the moving document, both the document and a second standard white board arranged outside the document passing area are read, by using the readout light source; and correction of the quantity of irradiation light of the readout light source is performed based on the reflected light from the second white board.

According to the first or second gist, at the time of document moving mode, the control section performs shading correction based on the quantity of reflected light of the first standard white board arranged wider than the whole width of the document passing area or of the document putting area in the main scanning direction, for example, corrects the difference in sensitivity between pixels of the readout section and the nonuniformity in the quantity of light of the light source, immediately before starting read in of the moving document.

After performing the shading correction to thereby make the readout section the optimum state, the control section moves the readout section to a position where the moving document can be read, and read the quantity of reflected light of the second standard white board provided in a prescribed location at an end portion in the main scanning direction where the document does not pass through, every time predetermined moving documents are read. The control section detects the change in the quantity of irradiation light of the readout section based on the result, and corrects the quantity of irradiation light of the readout section (readout light source).

Therefore, even if the quantity of irradiation light of the readout section decreases due to the continuous readout of the documents in the document moving mode, the quantity of irradiation light is maintained in the quantity of irradiation light after the shading correction performed by using the first standard white board, every time predetermined documents are read. Hence, the threshold of the white/black judgement determined by the shading correction does not shift, without reducing the read rate or without requiring complicated control, and high quality of reproduced document can be obtained.

According to the third gist, by arranging the second standard white board at both ends rather than at one end portion in the main scanning direction, more accurate correction of the quantity of light can be performed.

According to the fourth gist, in the document moving mode, the change in the quantity of light of the readout light source with lapse of time can be detected by providing the standard white board in a prescribed location in the external region of the end portion by utilizing the external region of the end portion in the main scanning direction in the area where the moving document does not pass through, and by reading the reflected light from this standard white board together with the reflected light from the moving document. Hence, it becomes possible to correct the quantity of light of the readout light source to the predetermined quantity of light based on the change in the quantity of light.

Therefore, even in the document moving mode, correction of quantity of light becomes possible every time a document is read, without reducing the read rate and without requiring complicated control, and thus, the change in the quantity of light due to the change with lapse of time of the light source at the time of continuous readout can be properly corrected.

According to the fifth gist, in the document moving mode, for example, shading correction of nonuniformity in the quantity of light, difference in sensitivity of the pixel portion to be read is performed based on the reflected light of the first standard white board immediately before initiating readout of the document. Then, the light source moves to the read position where the moving document is read, and even if the moving documents are continuously read to cause a change in the quantity of light due to the temperature increase of the light source, the change in the quantity of light of the readout light source can be detected and the change thereof with lapse of time can be corrected by reading the reflected light which is irradiated by using the light source and reflected from the second standard white board provided in the region where the document does not pass through, for example, in the external region of the end portion in the main scanning direction of the passing document, every time predetermined documents are read.

Therefore, in the document moving mode, the change in the quantity of light of the light source can be corrected, while performing continuous read of documents, and the quantity of light of the document can be maintained in the quantity of light corrected by using the first standard whiteboard. Hence, the threshold of the white/black judgement determined by the shading correction by using the first standard white board can be maintained, without interrupting continuous read for performing the shading correction, reducing the read rate or requiring complicated control, and high quality of reproduced document can be obtained.

DESCRIPTION OF THE PREFERRED EMBODIMENTS

As follows is a detailed description of an embodiment of the present invention with reference to the accompanying drawings. Here, an image forming apparatus installed with an image reader according to the present invention is exemplified.

Figure 1:
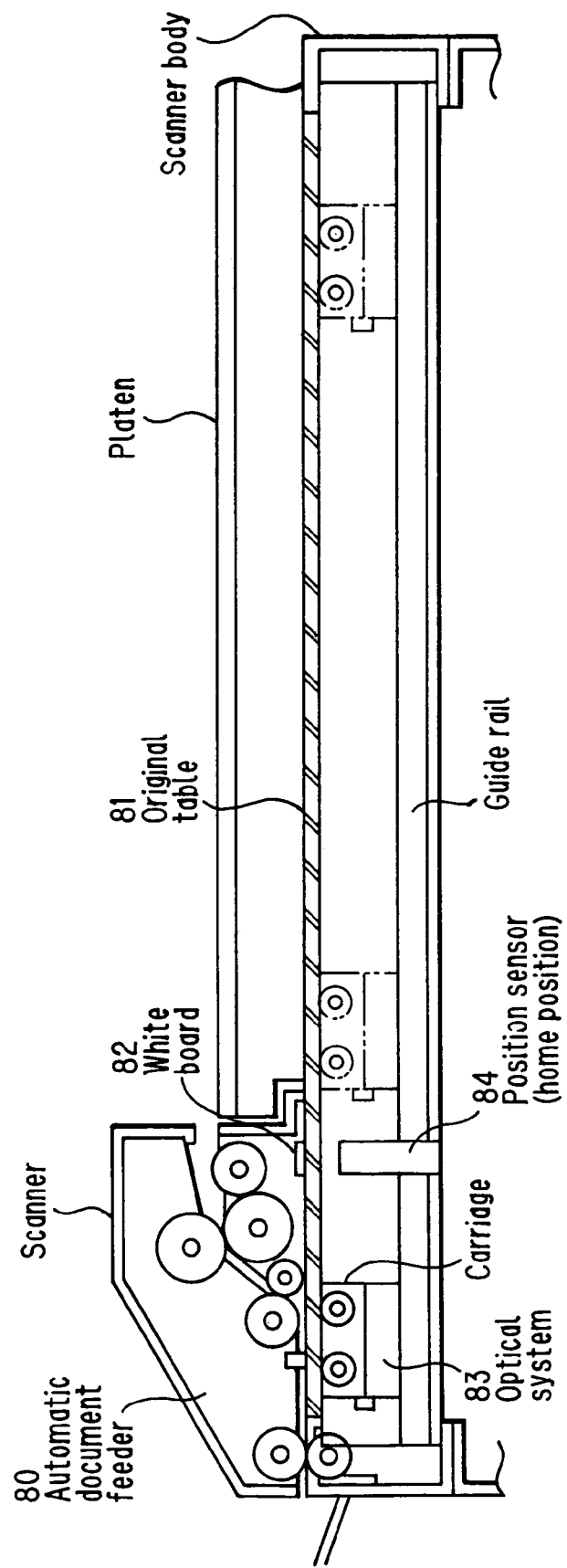
FIG. 1 is a front sectional view of an image forming apparatus having a conventional image reader.
Figure 2:
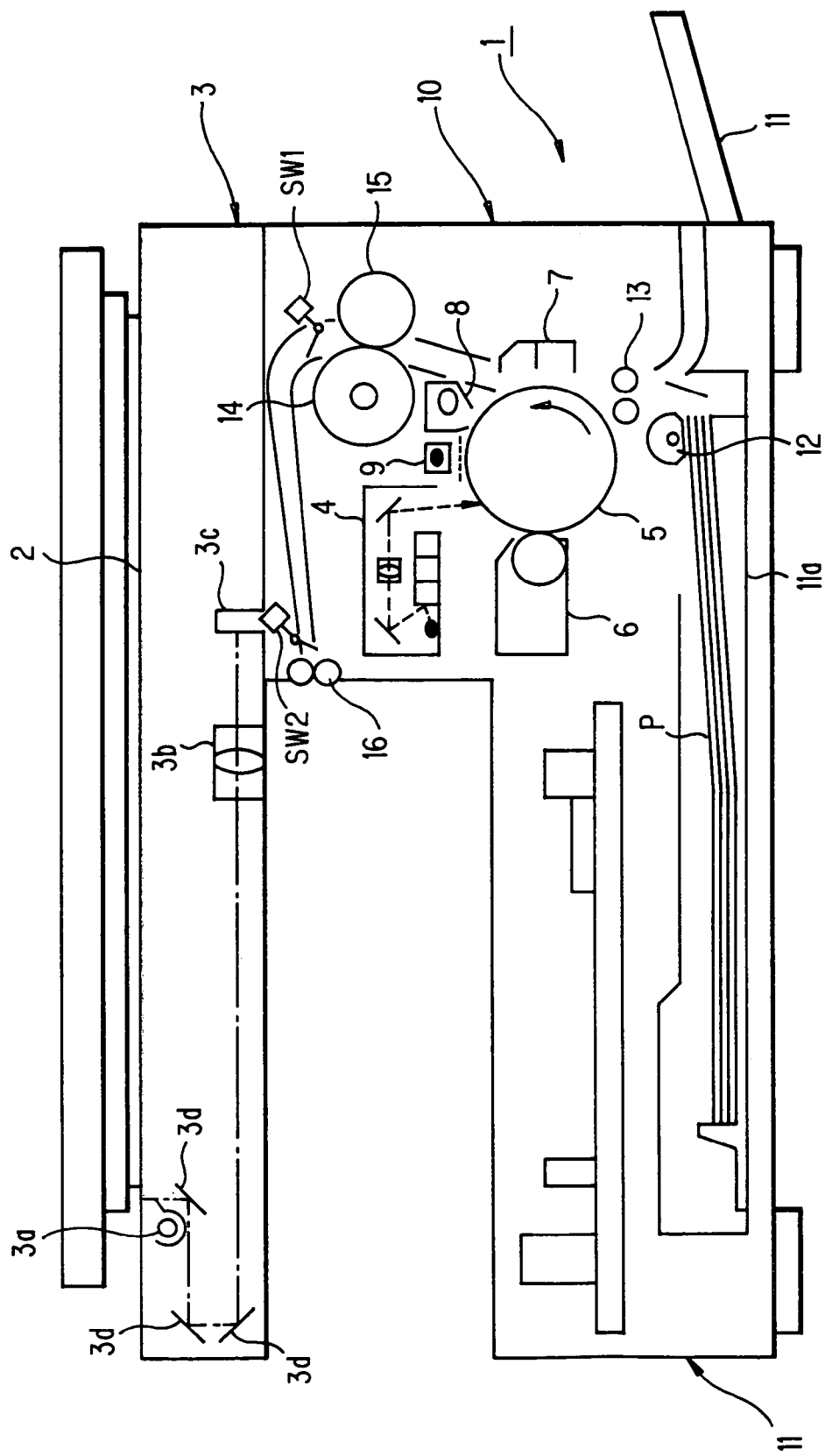
FIG. 2 is a front sectional view of an image forming apparatus having an image reader according to an embodiment of the present invention.

As shown in FIG. 2, an image forming apparatus which is one example of the image reader according to the present invention has an original table 2 comprising a transparent glass or the like on the upper face of the main body 1. Under the original table 2, a scanner section 3 which is an optical device is arranged.

As the scanning method of the optical device, in this embodiment, a scanning method using an image sensor (for example, CCD (Charge Coupled Device), PDA (Photo Diode Array) and the like) using a light source consisting of a plurality of lamp array will be described. However, the shape of the light source (for example, fluorescent light lamp, halogen lamp, flash lamp and the like as a linear light source) and the scanning method are not limited at all, and any shape of the light source and any scanning method may be used so far as the quantity of irradiation light is changed with lapse of time as the moving documents are continuously read.

The scanner section 3 in this embodiment comprises a light source 3a for irradiating light to a document put on the original table 2, a plurality of reflection mirrors 3d for guiding the reflected light from the document to a photoelectric conversion element (CCD) 3c arranged in the direction of light transmission (toward right in FIG. 2) through an imaging lens 3b in the scanner section 3, as shown in a chain line in the drawing, the aforesaid imaging lens 3b arranged in the optical path and the aforesaid CCD 3c.

The image data of the document read by the CCD 3c is subjected to image processing in an image processing section described later, and sent to a laser scanning unit (hereinafter referred to as LSU) 4 in an image forming section 10, and the LSU 4 irradiates laser beam to the surface of a photosensitive member 5 to form an electrostatic latent image on the surface of the photosensitive member 5.

The photosensitive member 5 is in a drum shape rotated and driven in the direction of an arrow. In the periphery of this photosensitive member 5, there are provided in the order of from a laser irradiation point toward the rotation direction of the photosensitive member 5, a development apparatus 6 for developing the electrostatic latent image on the surface of the photosensitive member exposed by the laser into a visual image by the toner, a transfer charger 7 for transferring the toner image on the photosensitive member 5 onto a paper, a cleaning device 8 for removing the residual toner on the surface of the photosensitive member 5, a main charger 9 for charging the photosensitive member to the predetermined electric potential, and LSU 4 for irradiating laser beam toward the laser irradiation point on the photosensitive member 5.

The transfer paper is stored in a paper cassette 11a in a paper feed section 11.

A semicircular roller 12 for feeding papers is provided on the upper part of the tip on the feeding side of the paper cassette 11a, and the transfer paper P pressed by the semicircular roller 12 is fed with the rotation of the semicircular roller 12. Moreover, in the image forming section 10, there are arranged, toward the downstream side in the carrying direction of the transfer paper P (for convenience sake, feeding side of the transfer paper P (cassette side) is designated as the upstream side and the paper ejection side is designated as the downstream side), a resist pre-detection switch (not shown) for detecting the passage of the transfer paper P, a resist roller 13 for performing the position adjustment of the toner image on the photosensitive member 5 and the transfer paper based on the signal from the resist pre-detection switch, a transfer charger 7 for transferring the toner image on the photosensitive member onto the transfer paper P, an upper fixing roller 14 and a lower fixing roller for fixing the toner image on the transfer paper by means of heat, a fixed paper detection switch SW1 for detecting that the transfer paper passes the fixing rollers 14 and 15, an ejection paper detection switch SW2 for detecting that the transfer paper passes before a paper ejection roller 16, and the aforesaid paper ejection roller 16 for ejecting the transfer paper.

Furthermore, a manual feed tray 17 is provided on the back side of the body 1, and depending upon the user's request, after the transfer paper has been inserted from the manual feed tray 17 to the aforesaid resist roller 13, the printing process is performed by means of the rotation of the resist roller 13 for performing the position adjustment of the toner image on the photosensitive member 5 and the transfer paper.

The printed transfer paper is ejected to the space adjacent to the image forming section 10, and between the upper part of the paper cassette 11 and the lower part of the scanner section 3.

In the case of a copying machine (including analogue and digital), in general, there is the one in which an image can be taken in a bigger size than the transfer paper. For example, the size of the image taken in the scanner section 3 is at maximum A3 or B4, and the transfer paper is at maximum A4 size. The size taken in the scanner section 3 is reduced and copied. In this case, among the scanner section 3, the image forming section 10 and the paper feed section (cassette section) 11, the one which requires the biggest area as the machine structure is the scanner section 3. Since it is necessary to take a document in a big size, it requires inevitably a big area. The image forming apparatus in FIG. 2 has such a construction.

Next is a description of the characteristic part of the present invention with reference to FIG. 3 to FIG. 8.

With the above described image forming apparatus 1, the second standard white boards B and C are provided in positions which are not used for actual document read, at the end portion in the main scanning direction (MS) of the position P2 for reading the moving document (FIG. 4) in the document moving mode. By reading the second standard white boards B, C together with the document at the time of reading the document to thereby correct the quantity of light of the light source, even in the document moving mode, readout of the document with adequate quantity of light becomes possible, and accurate shading correction can be performed.

Figure 3:
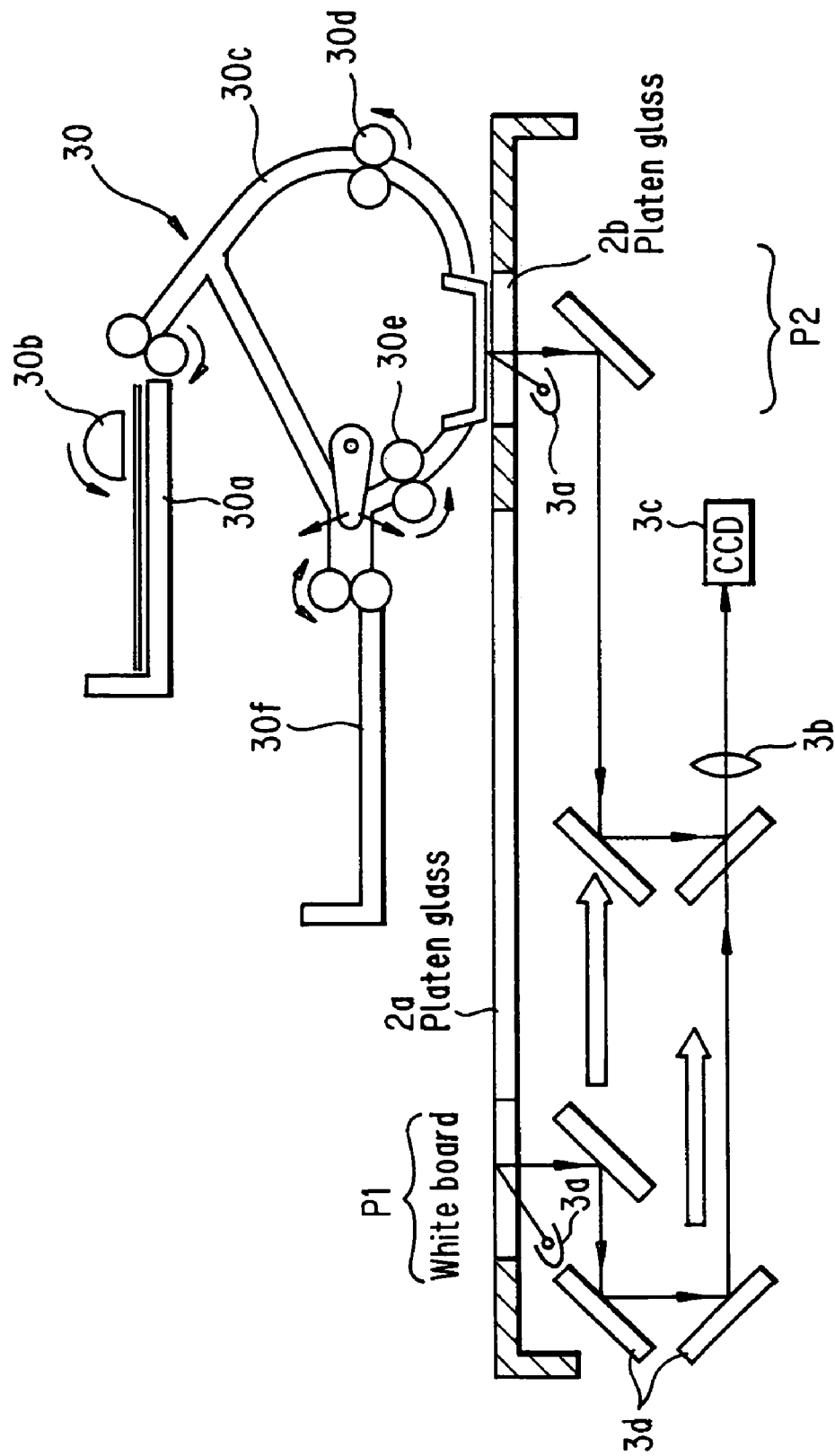
FIG. 3 is a front sectional view of a scanner section 3 and a document automatic feeder 30 according to an embodiment of the present invention.
Figure 4:
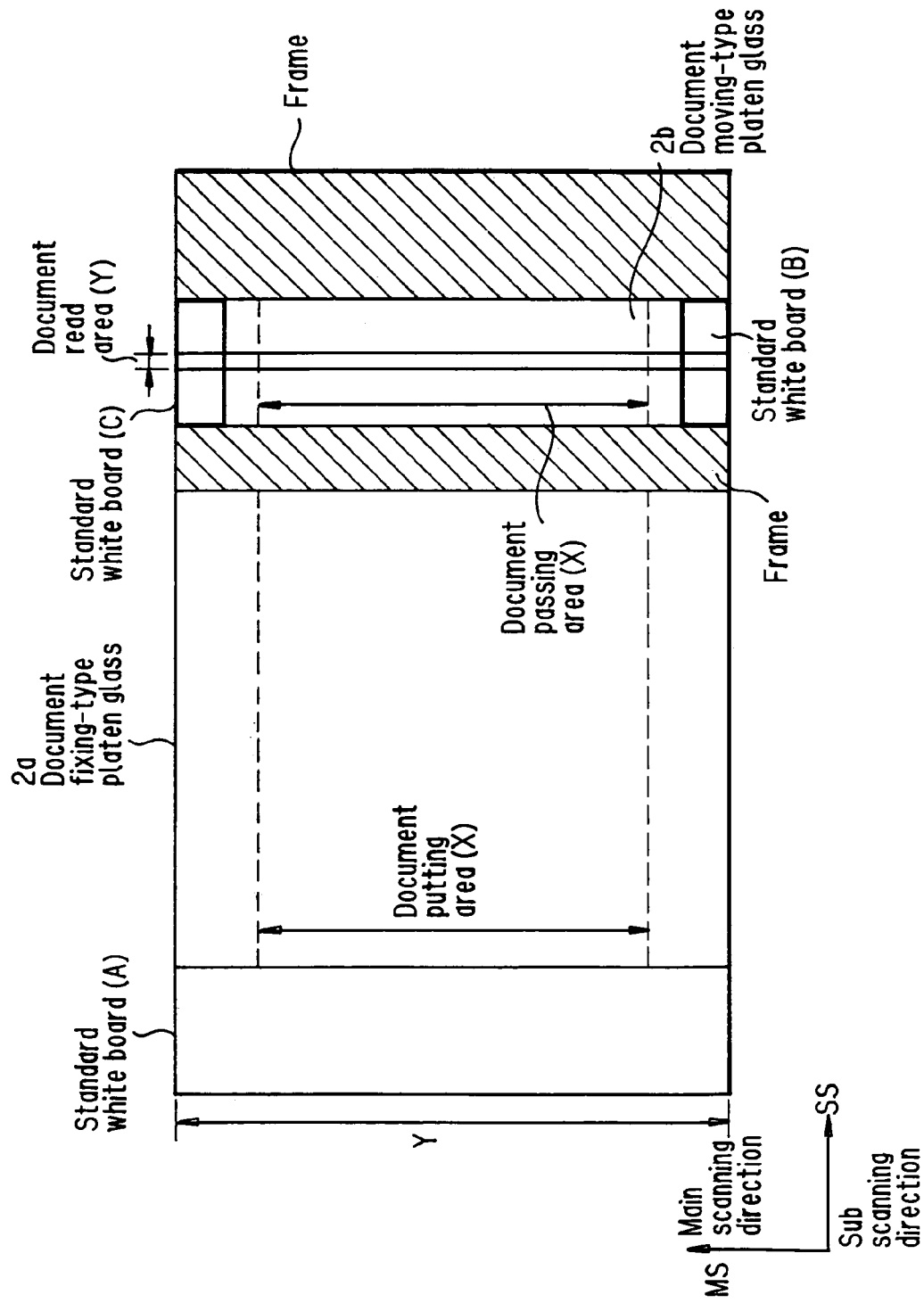
FIG. 4 is a top view of a scanner section 3 according to an embodiment of the present invention.

FIG. 3 is a sectional view of the scanner section 3, and FIG. 4 is a top view of the scanner section 3. The scanner section 3 is provided with a document fixing-type platen glass 2a on which the document is put in the document fixing mode, and a document moving-type platen glass 2b for reading the moving document carried by the document automatic feeder 30 arranged on the upper part of the body 1 in the document moving mode.

In the region on the one end side of the platen glass 2a in the sub scanning direction (SS) used in the document fixing method (FIG. 4), a belt-form first standard white board A whose whole length Y is the length extended from the width of the platen glass 2a in the main scanning direction towards both end sides by a predetermined width is arranged. Hereinafter, the position where the first standard white board A is arranged is referred to as a "home position P1".

On both sides in the main scanning direction of the document passing area X of the document moving type platen glass 2b used for reading the document which uses the document automatic feeder 30, rectangular second standard white boards B and C are provided in prescribed locations, and the length in the main scanning direction (in the right-angled direction to the moving direction of the document) from the second standard white board B via the document passing area X to the second standard white board C is the same with the length Y of the first standard white board A. Here, the document putting (passing) area shown by a symbol X in FIG. 4 (hereinafter may be referred to as "document occupancy area") is the maximum size of the document which can be read by the scanner section 3.

The size of the platen glasses 2a and 2b in the main scanning direction of the document fixing method and the document moving method is formed larger than the document occupancy area X, and the size of the light source 3a consisting of a plurality of lamp arrays in the longitudinal direction (the main scanning direction) is also formed larger than the document occupancy area X. Moreover, the document readout area Y where the CCD 3c can read the reflected light irradiated from the light source 3a in the document moving method is also formed longer than the document occupancy area X in the main scanning direction. Therefore, the readable area of the CCD 3c and the area between the both ends of the first standard white board A and the second standard white boards B, C are the same, hence read in of the first standard white board A and the second standard white boards B, C becomes possible.

Figure 5A:
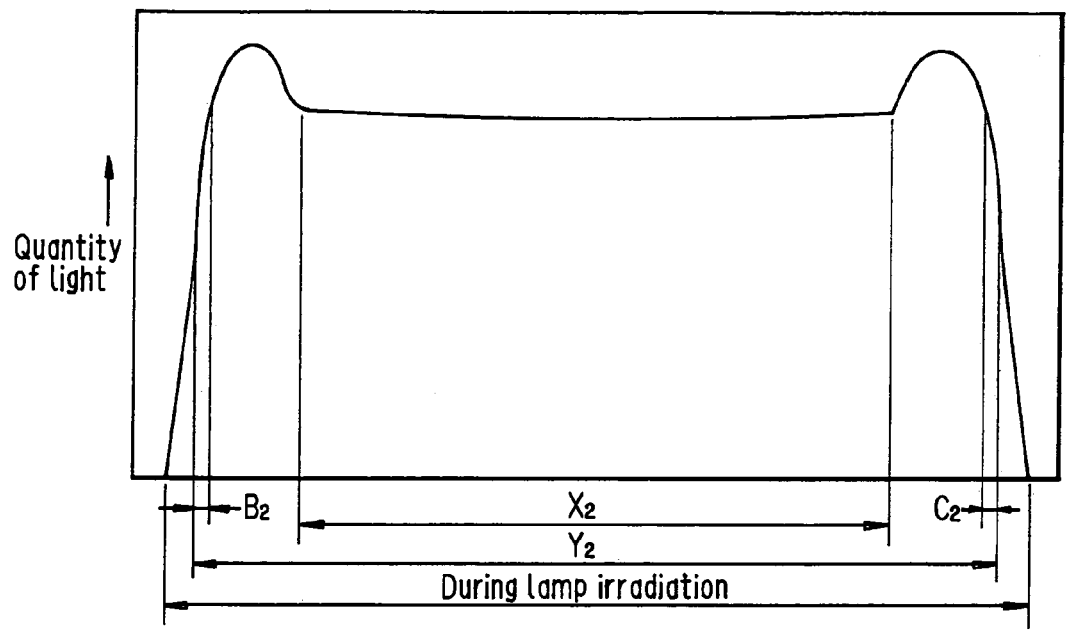
FIG. 5A and FIG. 5B are diagrams showing the light distribution characteristic (FIG. 5A) and the light distribution characteristic after continuous read (FIG. 5B) of a light source 3a for reading documents according to an embodiment of the present invention.

FIG. 5A shows the light distribution characteristic of the light source lamp at the time of read in in the main scanning direction, and shows that the peak quantity of light is after and before a predetermined time (distance) at the time of start and end of irradiation of the lamp, and the quantity of light becomes stable between the peak period.

Therefore, the light source 3a for reading the document is so set that the area of a symbol $X_2$ in FIG. 5A, that is, an area where the quantity of light of the light source 3a is uniform becomes the document occupancy area X used for the actual read of the document. In this drawing, a symbol $Y_2$ shows an irradiation period of the lamp between both ends of the first standard white board A and the second standard white boards B and C, a symbol $B_2$ shows the irradiation period of the second standard white board B and a symbol $C_2$ shows the irradiation period of the second standard white board C, respectively.

Figure 6:
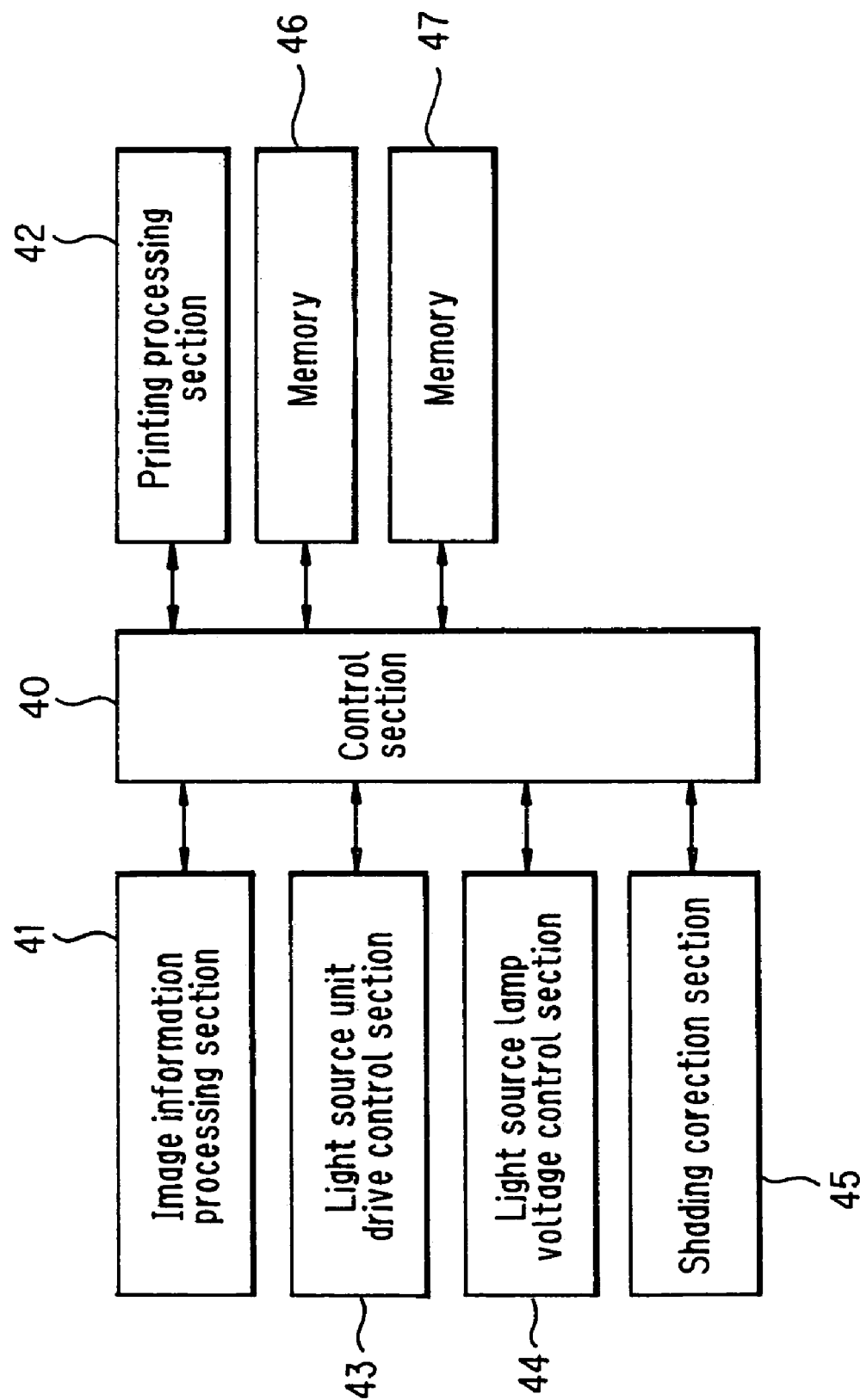
FIG. 6 is a block diagram of a control system of an image forming apparatus according to an embodiment of the present invention.

FIG. 6 is a block diagram of a control system of the above described image forming apparatus 1. To the control section 40 comprising CPU (Central Processing Unit) and the like are connected an image information processing section 41 for performing predetermined image processing to the image data and a printing processing section (image forming section) 42 for performing printing based on the image data processed in the image information processing section 41, as well as a light source unit drive control section 43, a light source lamp voltage control section 44, a shading correction section 45 and a plurality of memories 46, 47 and the like.

The light source unit drive control section 43 is for controlling the drive of the light source unit comprising the light source 3a and mirrors 3b of the scanner section 3, and the light source lamp voltage control section 44 is for controlling the applied voltage which determines the quantity of light of the light source 3a.

The shading correction section 45 controls the light source unit drive control section 43 via the control section 40 to perform the above described shading correction.

The operation at the time of reading the document will be described based on the flowchart, in both the document moving/document fixing modes in the image forming apparatus 1 having the construction described above.

Figure 7:
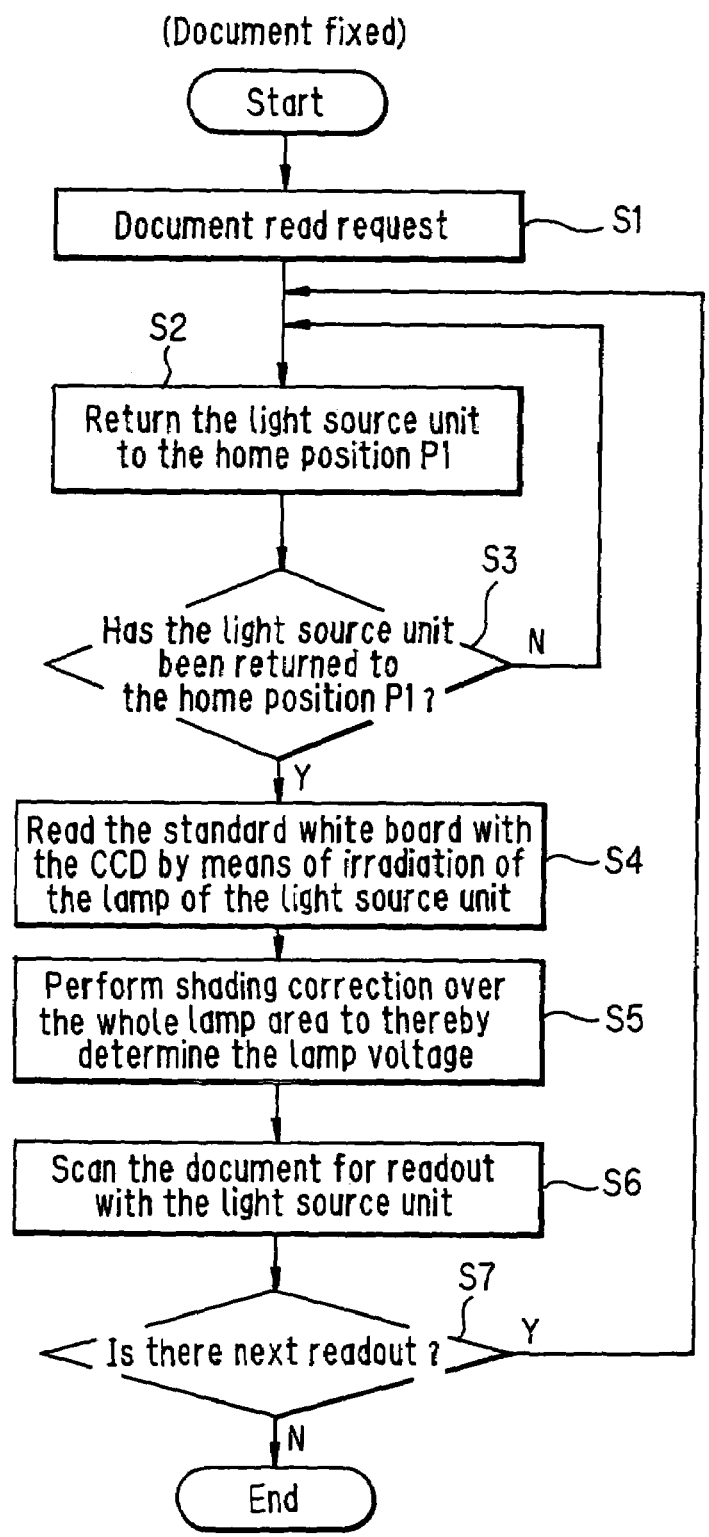
FIG. 7 is a flow chart of a readout operation in the document fixing mode of an image forming apparatus according to an embodiment of the present invention.

First, the reading operation in the document fixing mode will be described with reference to the flowchart in FIG. 7 and FIGS. 3 and 4.

When a document is put on the platen glass (original table) 2a of the image forming apparatus 1, and a not-shown start button is pushed, readout is started. When a document read request is received (S1), the light source 3a for reading documents is first returned to the home position P1 before reading the document (S2, S3).

Next, irradiate light to the first standard white board A arranged at the end portion of the platen glass 2a by means of the light source 3a returned to the home position P1, to read the reflected light of the first standard white board A by means of the CCD 3c via the mirrors 3d in the optical path and the lens 3b (S4).

Then, based on the quantity of reflected light of the first standard white board A read by the CCD 3c, perform the shading correction for correcting the difference in sensitivity for each pixel of the read sensor (CCD) and the nonuniformity in the quantity of light of the light source 3a, to thereby determine the threshold of the white/black judgement at the time of reading the document for each pixel (S5).

Thereafter, carry out the document read by scanning of the light source unit 3 in the document putting area for reading the document (S6), and if there is another document to be read, return to the step S2, and continue the above operation.

In such a document fixing mode, even at the time of continuous read, the shading correction for each pixel to be read is carried out for each document, hence the threshold of the white/black judgement for each pixel does not shift.

Figure 8:
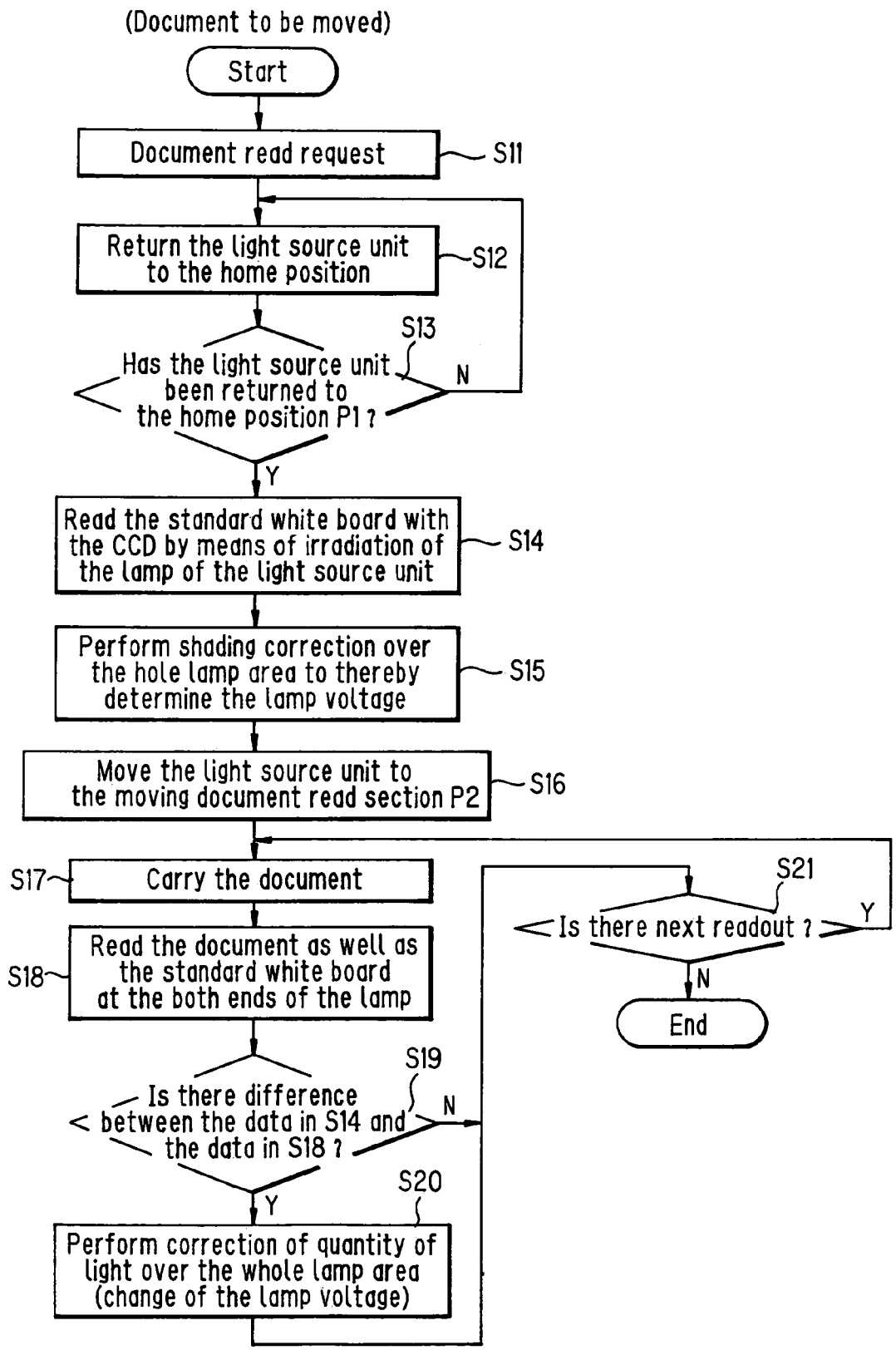
FIG. 8 is a flow chart of a readout operation in the document moving mode of an image forming apparatus according to an embodiment of the present invention.

Next is a description of the document read operation in the document moving mode with reference to the flowchart in FIG. 8 and FIGS. 3 and 4. A document is put on the document feed tray 30a in the document automatic feeder 30 shown in FIG. 3, and when the start button is pushed, the document is fed from the topmost layer by a pickup roller 30b, and carried through a carrier path 30c to the moving document read section by a resist roller 30d at a timing synchronous to the read timing. The read document is stored in a document ejection tray 30f by means of a carrier roller 30e in the carrier path 30c, and read of the next document is performed in the similar manner.

Here, when the start button (not shown) is pushed, readout is stated. As in the document fixing mode, when a document read request is received (S11), the light source 3a for reading documents is first returned to the home position P1 before reading the document (S12, S13).

Next, irradiate light to the first standard white board A arranged at the end portion of the platen glass 2a by means of the light source 3a returned to the home position P1, to read the reflected light of the first standard white board A by means of the CCD 3c via the mirrors 3d in the optical path and the lens 3b (S14).

Then, based on the quantity of reflected light of the first standard white board A read by the CCD 3c, perform the shading correction for correcting the difference in sensitivity for each pixel to be read by the read sensor (CCD 3c) and the nonuniformity in the quantity of light of the light source 3a, to thereby determine the threshold of the white/black judgement at the time of reading the document for each pixel (S15). At this time, at least the data such as applied voltage to the light source 3a after the shading correction between the portions $B_2$ and $C_2$ shown in FIG. 5A and the like is stored in the memory 46 (see FIG. 6).

Thereafter, move the light source 3a (optical system) in the sub scanning direction, and after the light source 3a has reached the moving document read section (downward of the platen glass 2b) P2 in the document moving mode (S16), carry the document to the moving document read section P2 (S17) to carry out the document read. Then, at the same time, read the reflected light of the second standard white boards B, C located at both ends in the longitudinal direction (in the main scanning direction) of the light source 3a by the CCD 3c (S18).

Figure 5B:
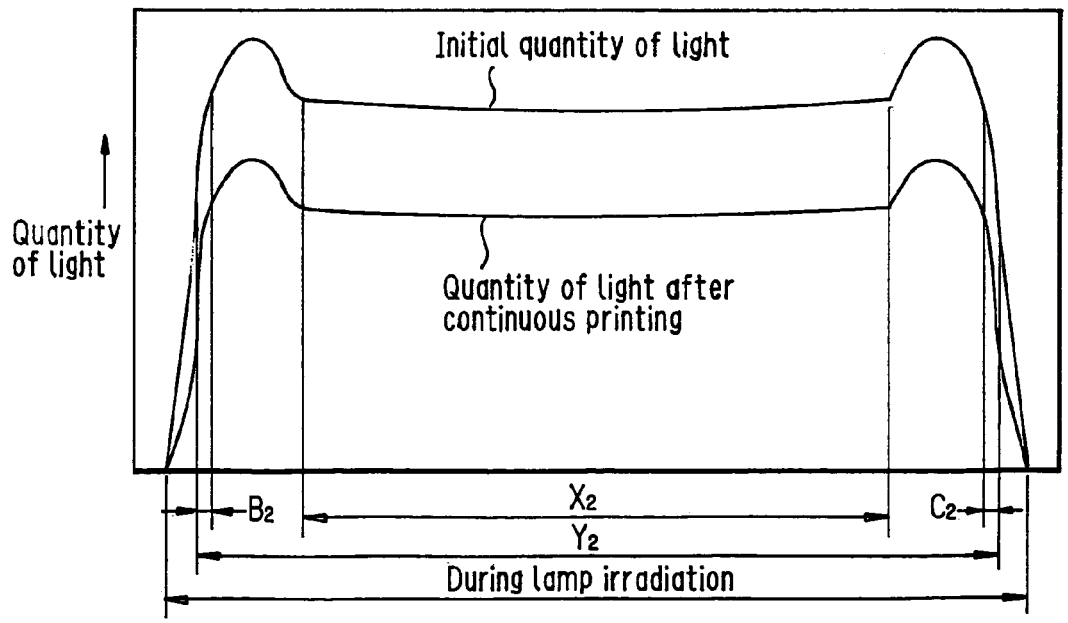

The light source 3a for reading documents has the light distribution characteristic as shown in FIG. 5A, and when documents are read continuously, since the lamp temperature increases, the quantity of light decreases as a whole as shown in FIG. 5B.

Therefore, in the step (S19), the data of quantity of light of the second standard white boards B and C read in the step (S18) is stored in the memory 47, as well as said data and the initial data of quantity of light using the first standard white board A which is stored in the memory 46 are compared in the control section 40. When there is a difference between those data, the light source lamp voltage control section 44 is controlled in the step (S20) to thereby adjust the voltage applied to the light source 3a, and the quantity of light is corrected so that the irradiation quantity to the second standard white boards B, C and the irradiation quantity to the first standard white board A become the same (see FIG. 5).

If the decrease in the quantity of light is not confirmed after the correction or in the step (S19), proceed to the step (S21), and if there is the next document to be read, return to the step (S17), and perform correction so that only the quantity of light of the whole area of the lamp in the light source 3a is changed to the initial quantity of light when the shading correction was performed in the step (S14).

By providing the processes as described above, even if in the document moving mode, the shading correction using the first standard white board A can only be performed to the first document by the light source unit located in the home position P1, the quantity of light of the light source 3a is monitored with respect to the document to be read thereafter, and when the quantity of irradiation light changes due to the change of the temperature of the light source with lapse of time, it can be corrected so as to maintain the initial quantity of light by adjusting the control voltage applied to the light source 3a. Hence, the threshold of the white/black judgement determined by the shading correction does not shift, without reducing the read rate or without requiring complicated control, and high quality of reproduced document can be obtained.

In the above described embodiment, a preferable example of the present invention has been described, but it is a matter of course that the present invention is not limited thereto. For example, in the above embodiment, correction of quantity of light is performed for every document by using the second standard white boards B and C. However, the correction timing of the quantity of light can be optionally selected, and optimum timing (number of documents) can be selected depending upon the readout quantity of continuous documents and the change in the quantity of irradiation light of the light source 3a.

Furthermore, in the above embodiment, the reflected light is determined at two positions of the second standard white boards B and C for performing correction of the quantity of light more reliably, but it is a matter of course that only one of them may be used.

As described above, according to the invention of the first or second gist, at the time of document moving mode, the control section performs shading correction based on the quantity of reflected light of the first standard white board arranged wider than the whole width of the document passing area or of the document read area in the main scanning direction, for example, corrects the difference in sensitivity between pixels of the readout section and the nonuniformity in the quantity of light of the light source, immediately before starting read in of the moving document.

After performing the shading correction to thereby make the readout section the optimum state, the control section moves the readout section to a position where the moving document can be read, and read the quantity of reflected light of the second standard white board provided in a prescribed location at an end portion in the main scanning direction where the document does not pass through, every time predetermined moving documents are read, and based on the result, the control section detects the change in the quantity of irradiation light of the readout section, and corrects the quantity of irradiation light of the readout light source.

Therefore, even if the quantity of irradiation light of the readout section decreases due to the continuous readout of the documents in the document moving mode, the quantity of irradiation light is maintained in the quantity of irradiation light after the shading correction performed by using the first standard white board, every time predetermined documents are read. Hence, the threshold of the white/black judgement determined by the shading correction does not shift, without reducing the read rate or without requiring complicated control, and high quality of reproduced document can be obtained.

According to the invention of the third gist, by arranging the second standard white board at both ends rather than at one end portion in the main scanning direction, more accurate correction of the quantity of light can be performed.

According to the invention of the fourth gist, in the document moving mode, the change in the quantity of light of the readout light source with lapse of time can be detected by providing the standard white board in a prescribed location in the external region of the end portion by utilizing the external region of the end portion in the main scanning direction in the area where the moving document does not pass through, and by reading the reflected light from this standard white board together with the reflected light from the moving document. Hence, it becomes possible to correct the quantity of light of the readout light source to the predetermined quantity of light based on the change in the quantity of light.

Therefore, even in the document moving mode, correction of quantity of light becomes possible every time a document is read, without reducing the read rate and without requiring complicated control, and thus, the change in the quantity of light due to the change with lapse of time of the light source at the time of continuous readout can be properly corrected.

According to the invention of the fifth gist, in the document moving mode, for example, shading correction of nonuniformity in the quantity of light, difference in sensitivity of the pixel portion to be read is performed based on the reflected light of the first standard white board immediately before initiating readout of the document. Then, the light source moves to the read position where the moving document is read, and the moving documents are continuously read to cause a change in the quantity of light due to the temperature increase of the light source. However, the change in the quantity of light of the readout light source can be detected and the change thereof with lapse of time can be corrected by reading the reflected light which is irradiated by using the light source and reflected from the second standard white board provided in the region where the document does not pass through, for example, in the external region of the end portion in the main scanning direction of the passing document, every time predetermined documents are read.

Therefore, in the document moving mode, the change in the quantity of light of the light source can be corrected, while performing continuous read of documents, and the quantity of light of the document can be maintained in the quantity of light corrected by using the first standard white board. Hence, the threshold of the white/black judgement determined by the shading correction by using the first standard white board can be maintained, without interrupting continuous read for performing the shading correction, reducing the read rate or requiring complicated control, and high quality of reproduced document can be obtained.

What is claimed is:

1. An image reader having a document moving mode in which an original document carried through a document passing area on an original table is read by a readout section, characterized in that:
   the readout section comprises a light source for irradiating light to the document;
   a first standard white board being longer than the length of said document passing area with respect to the main scanning direction is provided outside the document passing area;
   a second standard white board is provided in an external region of an end portion of the document passing area with respect to the main scanning direction;
   a control section controls the readout section in such a way that, in the document moving mode, the readout section reads the first standard white board prior to the initiation of the document read to thereby perform the shading correction, and after the document read has been initiated, said readout section reads the moving document as well as the reflected light of the second standard white board, so as to correct the quantity of irradiation light of the light source, based on a difference between a first data of quantity of light of the first standard white board and a second data of quantity of light of the second standard white board, and reads subsequent moving documents as well as the reflected light of the second white board without rereading the first standard white board so as to continue to correct the quantity of irradiation light with respect to the subsequent moving documents.

2. An image reader having both of a document fixing mode in which a readout section moves to read an original document put in a document putting area on an original table and a document moving mode in which the original document carried through a document passing area on the original table is read by the readout section, characterized in that:
   the readout section comprises a light source for irradiating light to the document;
   a first standard white board being longer than the length of said document putting area with respect to the main scanning direction is provided outside the document putting area;
   a second standard white board is provided in an external region of an end portion of the document passing area with respect to the main scanning direction;
   a control section controls the readout section in such a way that, in the document moving mode, the readout section reads the first standard white board prior to the initiation of the document read to thereby perform the shading correction, and after the document read has been initiated, said readout section reads the moving document as well as the reflected light of the second standard white board, so at to correct the quantity of irradiation light of the light source, based on a difference between a first data of quantity of light of the first standard white board and a second data of quantity of light of the second standard white board, and reads subsequent moving documents as well as the reflected light of the second white board without rereading the first standard white board so as to continue to correct the quantity of irradiation light with respect to the subsequent moving documents.

3. An image reader according to claim 1, wherein said second standard white board is provided in the external region of both end portions of the document passing area with respect to the main scanning direction.

4. A method for correcting the quantity of light of a readout light source used in an image reader which irradiates an original document with the readout light source and reads the original document image based on the reflected light thereof, wherein:
   in a document moving mode in which the document moves,
   correction of the quantity of irradiation light of the readout light source is performed by reading a first standard white board which is longer than the length in the main scanning direction of a document passing area, prior to the initiation of the document read;

upon initiation of readout of the moving document, both the document and a second standard white board arranged outside the document passing area are read, by using said readout light source;

correction of the quantity of irradiation light of said readout light source is performed based on a difference between a first data of quantity of light of the first standard white board and a second data of quantity of light of the second standard white board; and subsequent moving documents as well as the reflected light of the second white board are read without rereading the first standard white board so as to continue to correct the quantity of irradiation light with respect to the subsequent moving documents.

5. An image reader according to claim 2, wherein said second standard white board is provided in the external region of both end portions of the document passing area with respect to the main scanning direction.

* * * * *